United States Patent
Fleming et al.

[19]

[11] Patent Number: 6,080,339
[45] Date of Patent: Jun. 27, 2000

[54] PROCESS FOR FABRICATING SILICA ARTICLE UTILIZING SOL-GEL EXTRUSION

[75] Inventors: Debra Anne Fleming, Berkeley Heights; Philip Hubbauer, Millington; David Wilfred Johnson, Jr., Bedminster; John Burnette MacChesney, Lebanon; Thomas Edward Stockert, Millburn; Frederick W. Walz, Jr., Plainfield, all of N.J.

[73] Assignee: Lucent Technologies Inc., Murray Hill, N.J.

[21] Appl. No.: 09/097,496

[22] Filed: Jun. 15, 1998

Related U.S. Application Data

[60] Provisional application No. 60/059,950, Sep. 26, 1997.

[51] Int. Cl.$^7$ .................................................... B29D 11/00
[52] U.S. Cl. .................................. 264/1.21; 264/211.11; 264/299; 264/623
[58] Field of Search ...................... 264/623, 299, 264/211.11, 1.21

[56] References Cited

U.S. PATENT DOCUMENTS

| | | | |
|---|---|---|---|
| 4,217,027 | 8/1980 | MacChesney et al. | 350/96.3 |
| 4,262,035 | 4/1981 | Jaeger et al. | 427/39 |
| 4,682,995 | 7/1987 | Clasen . | |
| 4,685,946 | 8/1987 | Derks et al. . | |
| 4,775,401 | 10/1988 | Fleming et al. | 65/3.11 |
| 4,816,051 | 3/1989 | Clasen et al. . | |
| 4,902,328 | 2/1990 | Knauff et al. . | |
| 4,909,816 | 3/1990 | MacChesney et al. | 65/3.12 |
| 4,940,675 | 7/1990 | Bohlayer et al. | 501/12 |
| 5,160,455 | 11/1992 | Clark et al. | 252/315.7 |
| 5,240,488 | 8/1993 | Chandross et al. | 65/3.11 |
| 5,304,331 | 4/1994 | Leonard et al. | 264/141 |

FOREIGN PATENT DOCUMENTS

| | | | |
|---|---|---|---|
| 61-106427 | 10/1984 | Japan | C03B 8/02 |
| 61-256928 | 5/1985 | Japan | C03B 8/02 |
| 61-256938 | 5/1985 | Japan | G03B 37/016 |

OTHER PUBLICATIONS

"Preparation of High–Purity Silica glasses by Sintering of Colloidal Particles", by Clasen, R., *International Journal of Glass Science and Technology*, vol. 60, pp. 125–132 (1987).
"Fiber Drawing and Strength Properties", by DiMarcello, F. V. et al., *Optical Fiber Communications*, vol. 1, Edited by Li, T., Academic Press Inc., pp. 179–249.

*Primary Examiner*—Christopher A. Fiorilla
*Attorney, Agent, or Firm*—Scott J. Rittman

[57] ABSTRACT

The invention is a sol-gel extrusion process which allows fabrication of both thick and thin wall tubes. For example, the process is capable of preparing silica overcladding tubes in a manner easier than sol-gel casting processes, and also capable of preparing relatively thin substrate tubes, which are difficult to cast. According to the invention, a silica dispersion containing a stabilizing agent is provided, a gelling agent is added to the dispersion to induce gellation, and the resultant gel is extruded into a silica body, in the substantial absence of polymeric material from the gel. Substantially avoiding the inclusion of such polymeric material in overcladding and substrate tubes offers significant commercial advantages by reducing the time and energy required to remove organic materials from the tube bodies, by reducing environmental impact, and by reducing the amount of impurities introduced in the tubes.

49 Claims, 1 Drawing Sheet

PROCESS FOR FABRICATING SILICA ARTICLE UTILIZING SOL-GEL EXTRUSION

CROSS-REFERENCE TO RELATED APPLICATION

This application claims priority of Provisional Application Ser. No. 60/059,950 which was filed on Sep. 26, 1997.

BACKGROUND OF THE INVENTION

1. Field of the Invention

The invention relates to the use of sol-gel processes to form silica bodies.

2. Discussion of the Related Art

Optical fiber is produced from a glass preform. As discussed in F. DiMarcello et al. "Fiber Drawing and Strength Properties," *Optical Fiber Communications*, Vol. 1, Academic Press, Inc., 1995, at 179–248, the disclosure of which is hereby incorporated by reference, the preform is generally arranged vertically in a draw tower such that a portion of the preform is lowered into a furnace region. The portion of the preform placed into the furnace region begins to soften, and the lower end of the preform forms what is known as the neck-down region, where glass flows from the original cross-sectional area of the preform to the desired cross-sectional area of the fiber. From the lower tip of this neck-down region, the optical fiber is drawn.

Optical transmission fiber typically contains a high-purity silica glass core optionally doped with a refractive index-raising element such as germanium, an inner cladding of high-purity silica glass sometimes doped with a refractive index-lowering element such as fluorine, and an outer cladding of undoped silica glass. In some manufacturing processes, the preforms for making such fiber are fabricated by forming an overcladding tube for the outer cladding, and separately forming a rod containing the core material and inner cladding material. The core/inner cladding are fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material. To obtain a finished preform, the overcladding tube is typically placed over the core rod, and the components are heated and collapsed into a solid, consolidated preform, as discussed in U.S. Pat. No. 4,775,401, the disclosure of which is hereby incorporated by reference.

Forming a fiber preform using an MCVD process therefore requires both a substrate tube and an overcladding tube. Previously, both types of tubes were formed from fused quartz or by soot methods, i.e., depositing glass on a mandrel by directing at the mandrel glass particles formed by flame hydrolysis of silicon tetrachloride. Both methods were energy intensive and costly, however, and alternatives were sought.

Because the outer cladding of a fiber is distant from transmitted light, the overcladding glass does not in all cases have to meet the optical performance specifications to which the core and the inner cladding must conform (but still must be substantially free of flaw-inducing refractory oxide particles). For this reason, efforts to both ease and speed manufacture of fiber preforms focused on methods of making overcladding tubes. One area of such efforts is the use of a sol-gel casting process.

U.S. Pat. No. 5,240,488 (the '488 patent), the disclosure of which is hereby incorporated by reference, discloses a sol-gel casting process capable of producing crack-free overcladding preform tubes of a kilogram or larger. In the process of the '488 patent, a colloidal silica dispersion, e.g., fumed silica, is obtained. To maintain adequate stability of the dispersion and prevent agglomeration, the pH is raised to a value of about 11 to about 14 by use of a base. A typical base is tetramethyl ammonium hydroxide (TMAH). Upon introduction of the TMAH, substantially complete dissociation to TMA+ and OH$^-$ occurs, raising the pH value. Other quaternary ammonium hydroxides behave similarly. When the pH is so raised, the silica, it is believed, takes on a negative surface charge due to ionization of silanol groups present on the surface. The negative charge of the silica particles creates mutual repulsion, preventing substantial agglomeration and maintaining the stability of the dispersion. Polymer additives, e.g., binders and lubricants, are included to improve the physical properties of the gelled bodies. As discussed in the Table of the '488 patent, the dispersion is then aged for a time ranging from 1 to 20 hours.

Subsequent to aging, as discussed in Col. 15, lines 39–65 of the '488 patent, a gelling agent such as methyl formate is added to the dispersion to lower the pH. The methyl formate reacts with the water and/or base to generate H$^+$ ions that neutralize the negative character of the silica particles. The hydrolysis of the ester occurs over approximately 10 minutes, at which time enough ions are formed to neutralize the silica to a degree where gellation is induced. (Gellation, as used herein, indicates that the colloidal silica particles have formed a three-dimensional network with some interstitial liquid. Existence of such a three-dimensional network is typically indicated when the dispersion becomes essentially non-flowing, e.g., exhibiting solid-like behavior, at room temperature.) Typically, once the gelling agent is added, but before gellation occurs, the mixture is pumped into a tubular mold containing a central mandrel, and the gel is aged in the mold for 1 to 24 hours. The mandrel is removed, and the gelled body is then extracted from the mold, typically by launching the body from the mold in water to prevent breakage. The body is then dried, fired to remove volatile organic materials and water, and then sintered to form the finished overcladding.

While useful overcladding bodies are obtained by processes such as that of the '488 patent, the casting process is relatively slow and requires simultaneous casting in hundreds of molds to produce the amount of tubes required for commercial feasibility. In addition, in some circumstances, it is desired to reduce the amount of polymer additives typically added to casting formulations. Processes that require lesser amounts of such additives would therefore be advantageous.

Sol-gel casting methods such as that of the '488 patent typically have not been used to produce commercial substrate tubes. Specifically, substrate tubes have thin walls, e.g., about 5 mm thick prior to drying and sintering, and therefore require stronger gel bodies than overcladding tube. Yet, the stronger tubes needed are extremely difficult to cast as a gel without encountering slumping or breaking of the tubes during post-extrusion processing.

Improved sol-gel methods, useful for fabricating both overcladding tubes and substrate tubes, are therefore desired.

SUMMARY OF THE INVENTION

The invention relates to a sol-gel extrusion process which allows fabrication of relatively large silica bodies, e.g., useful for preparing optical fiber preforms. In particular, the invention allows fabrication of silica overcladding tubes in a manner easier and typically faster than sol-gel casting processes, and also allows fabrication of substrate tubes from a sol-gel. According to the invention, a silica dispersion containing a stabilizing agent is provided, a gelling agent is added to the dispersion to induce gellation, and the resultant gel is extruded to form a silica body, in the substantial absence, i.e., less than 0.5 weight percent (wt. %), of polymeric materials from the gel, advantageously less than 0.2 wt. %. (As used herein, the term body indicates an extrudate having a length of at least about 1 meter and a cross-sectional area of at least about 6 cm$^2$, or having a weight of at least about 750 g. Polymeric material indicates a lubricant such as glycerin or a carbon-based polymeric binder having a molecular weight of about 10,000 or higher and alkali concentrations less than about 10 parts per million.)

The invention constitutes a significant step forward compared to existing sol-gel extrusion processes. Presently, sol-gel extrusion of dielectric materials is generally limited to two situations. First, sol-gel extrusion has been used to form small abrasive oxide particles, such as in U.S. Pat. No. 5,304,331. But in forming such small particles, wide variation is allowable in the physical properties of the gel, since the gel is simply broken up or forced into small apertures upon exiting the extruder die. By contrast, forming gelled bodies, e.g., suitable for overcladding or substrate tubes, requires more controlled chemistry and properties and a more controlled process in order to avoid slumping and breakage during post-extrusion processing.

Second, sol-gel extrusion has been used to produce bodies, but only where a substantial amount, e.g., 2 wt. % or greater, of a polymer binder such as polyvinyl alcohol is included in the gel to prevent breakage or other damage to the extrudate. See, e.g., R. Claussen, "Preparation of high-purity silica glasses by sintering of colloidal particles," *Glastech. Ber.* 60 (1987) Nr. 4.; and R. Claussen Dissertation entitled "Extrusion Molding." However, polymers typically must be chemically extracted or burned out to prevent detrimental effects in the final sintered body, particularly for overcladding and substrate tubes. The more polymer introduced in a sol-gel process, the greater the time and energy required to remove the polymer, and the greater the amount of volatile organics released into the atmosphere. Moreover, most polymers added to gels contain sodium as an impurity, which causes harmful devitrification of the glass upon sintering. It is also possible for remnants of the added polymers to remain in the body to the detriment of the finished glass product. The invention, in contrast, by substantially avoiding the inclusion of polymeric material, offers significant advantages. Specifically, the invention reduces the time and energy required to remove organic materials from the tube bodies, reduces volatile organics released into the atmosphere, reduces the amount of impurities in the final, fired bodies, and allows for production of fully transparent fired bodies.

Thus, contrary to present processes for extruding small abrasive particles, and to the view expressed in the Claussen references that a substantial amount of polymer binder is required for successful extrusion of large gel bodies, the invention provides extruded gel bodies, particularly overcladding and substrate tubes, in the substantial absence of polymeric material from the gel.

DETAILED DESCRIPTION OF THE INVENTION

Figure 1:
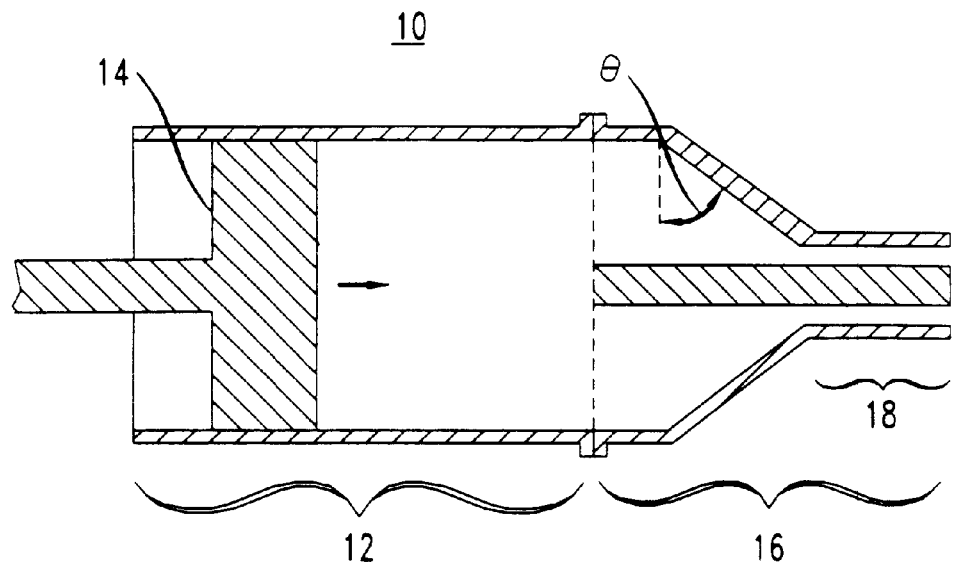
FIG. 1 is a cross-sectional schematic of a piston extruder suitable for use in the process of the invention.

According to an embodiment of the invention, an aqueous colloidal silica dispersion is obtained, optionally with small amounts of dopant materials, e.g. GeO$^2$. Advantageously, the dispersion contains about 30 to about 70 wt. % silica, more advantageously about 40 to about 60 wt. % silica, based on the weight of the dispersion. The silica advantageously has a surface area of about 30 to about 100 m$^2$/g, more advantageously about 40 to about 50 m$^2$/g. Below 30 wt. % silica and 30 m$^2$/g, the resultant gel is typically too weak, and above 70 wt. % silica and 100 m$^2$/g, the viscosity of the dispersion is typically too high.

The silica dispersion is mixed with a stabilizing agent, typically a Lewis base. As discussed previously, the base typically dissociates in the silica dispersion, raising the pH and, it is believed, inducing ionization of silanol groups on the silica particles. The negative charge of the silanol groups appears to create mutual repulsion of the silica particles, stabilizing the dispersion. The pH of the dispersion containing the stabilizing agent is typically about 10.5 to about 13.5, with lower pH values typically resulting in weak gels, and higher pH values typically requiring excessive amounts of base and causing rapid gellation. The stabilizing agent advantageously contains at least one of the following bases: tetramethyl ammonium hydroxide (TMAH), ammonium hydroxide (NH$_4$OH), and tetraethyl ammonium hydroxide. The agent is advantageously present in an amount ranging from about 0.1 to about 2 wt. %, more advantageously about 0.3 to about 1 wt. %, based on the weight of the overall silica dispersion (i.e., the silica dispersion plus additives). Amounts less than about 0.1 wt. % typically result in dispersions with undesirably low pH, and amounts greater than about 2 wt. % typically result in excessive dilution of the dispersion, brittle gels, and undesirably rapid gelation.

Optionally, polymeric material additives such as binders or lubricants are included. Conventionally, binders act to enhance plasticity, and lubricants act to aid in deformability and flow of a material through a die. However, in the process of the invention, less than 0.5 wt. % polymeric material is added to the silica dispersion, advantageously less than 0.2 wt. %, and more advantageously substantially no polymeric material is included (i.e., less than 0.01 wt. % polymeric material is found in the gel). An example of a binder is polyethyloxazoline, as discussed in U.S. Pat. No. 5,240,488, referenced above, and polyvinyl alcohol is another binder. An example of a lubricant is glycerine, as also discussed in U.S. Pat. No. 5,240,488. Other binders and lubricants are known to those skilled in the art.

It is possible to age the silica dispersion after the stabilizing agent, and any polymeric material, is added. Aging brings the silica and base into equilibrium, producing the desired repulsive silica surface layer. Typical aging periods range from zero to about 2 days. It is generally desirable to de-air the dispersion after aging. De-airing involves evacuating the sol to a pressure of a few mm of mercury, and is performed in order to remove trapped air that causes bubbling in the gel and pores in the resulting glass body.

After aging and de-airing, gelling agent is added to the silica dispersion. The gelling agent is typically an ester that reacts with the water and/or base at a controlled rate to generate $H^+$ ions that, it is believed, neutralize the negative surface charge of the silica particles. In this manner, gellation is induced. Examples of gelling agents include methyl formate, ethyl lactate, ethyl formate, methyl acetate, and ethyl acetate. The gelling agent is advantageously added in an amount ranging from about 0.5 to about 3 moles per mole of stabilizing agent, more advantageously about 1.5 to about 2.5 moles gelling agent per mole of stabilizing agent. Amounts of gelling agent less than about 0.5 moles per mole of stabilizing agent typically result in poorly gelled bodies, and greater than about 3 moles per mole of stabilizing agent typically results in brittle gel bodies and undesirably rapid gelation. Optionally, the mixture is de-aired after mixing.

It is advantageous to combine the stabilized dispersion and the gelling agent in a mixing device such as a static mixer. Typically, the mixture is pumped, so as not to entrap air, into the barrel of an extruder, e.g., a piston extruder, immediately after mixing and thus prior to gellation. In addition, the sol and gelling agent are optionally chilled to temperatures of about 5 to about 15° C. to slow gellation such that there is adequate time to de-air and pump the liquid into the barrel of an extruder. Once the mixture is pumped into the barrel, gellation is allowed to occur in the barrel, for a time period typically ranging from about 10 minutes to about 2 hour.

It is expected to be possible to utilize, in the extrusion process of the invention, the sol-gel reaction mechanism disclosed in U.S. provisional patent application Ser. No. 60/060,141, filed Sep. 26, 1997, entitled "Fabrication Including Sol-Gel Processing" (our reference Chen-Patel-Valdes 1-1-10), the disclosure of which is hereby incorporated by reference.

When the mixture has gelled sufficiently, the gel is extruded. Typically, the gel reaches a viscosity of about 18,000 to about 100,000 cps before extrusion is performed, advantageously about 25,000 to about 75,000 cps, more advantageously about 30,000 to about 40,000 cps. This viscosity range typically allows for extrusion of a body, e.g., a tube, without experiencing breakage. Several aspects of the process are capable of being adjusted or selected to obtain a gel within this viscosity range. For example, the viscosity will increase over time once the gelling agent is mixed with the dispersion, up to a plateau at which gellation is substantially complete. The desired viscosity, therefore, will typically be attained at a certain point in time during gellation, at which time extrusion is performed. However, the particular stabilizing agents, and their concentration, will of course affect the time over which such viscosity increase occurs and the ultimate viscosity attained. In addition, a higher concentration of silica in the dispersion will typically lead to a higher ultimate viscosity in the gelled mixture (and higher viscosities in shorter gelling times). Control samples are easily prepared to determine appropriate conditions for attaining a desired viscosity just prior to extrusion.

For the extrusion, it is possible to use, for example, a piston extruder or a screw extruder, of the types known to those skilled in the art. A typical piston extruder 10 is shown in FIG. 1. The extruder 10 contains a barrel 12, in which the mixture of the dispersion and gelling agent is typically allowed to gel. A piston 14 tightly within the barrel 12 and pushes the gel through the extruder 10. The barrel 12 is attached to a die-land 16 having a die portion 18 that provides the extruded article with the desired features, e.g., the inner and outer diameters of a tubular body. The extruder 10 has a die angle, Θ, which reflects the sharpness of the change in inner diameter from the barrel 12 to the die-land 16.

To form tubular bodies such as overcladding tubes or substrate tubes, a variety of extruder parameters, applicable to various type of extruder mechanisms, have been found to be advantageous. The ratio of the cross-sectional area within the barrel to the cross-sectional area within the die portion is advantageously about 2 to about 10, more advantageously about 5 to about 8. The ratio of the length of the die-land to the inner diameter of the die portion of the die-land is advantageously about 1 to about 4. The extrusion is advantageously performed such that the extrudate exits the die-land at a rate of about 0.25 to about 10 meters/minute, more advantageously about 1 to about 6 meters/minute. The die angle, Θ, of the extruder used in the process of the invention is advantageously about 10 to about 45 degrees. The pressure in the barrel of the extruder is advantageously about 30 to about 300 psi.

Figure 2:
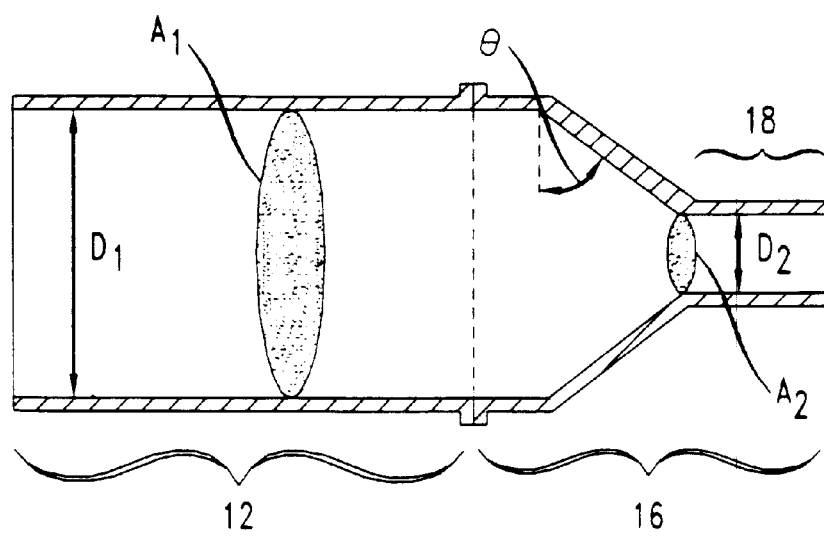
FIG. 2 illustrates area reduction rate in an extruder.

Another useful parameter is area reduction rate. Area reduction rate (ARR) is defined according to equation:

$$ARR = \frac{2(A_1)(V)}{(A_2)(D_1 - D_2)(\tan\Theta)}$$

where, as reflected in FIG. 2, $A_1$ is the cross-sectional area within the barrel 12;

$D_1$ is the inner diameter of the barrel 12;

$A_2$ is the cross-sectional area within the die portion 18;

$D_2$ is the inner diameter of the die portion 18;

Θ is as defined above; and

V is the speed of the piston.

Advantageously, the area reduction rate is about 2 to about 10 sec$^{-1}$.

To form overcladding tubes for preforms having a final outer diameter of about 40 to about 80 mm, the barrel typically has an inner diameter of about 10 cm to about 25 cm. For substrate tubes useful in forming the same diameter preforms, the barrel typically has an inner diameter of about 8 cm to about 15 cm.

The materials used to fabricate the extruder parts are important where the article being made is an optical fiber preform or another body that requires high purity. Transition metal impurities are known to increase losses in optical fiber, and thus it is desired to introduce as little impurities as possible from the extruder equipment into the glass preform, e.g., less than 100 ppm. Typically, the barrel, land, and die of an extruder (and the auger of a screw extruder) are formed from aluminum or stainless steel. Stainless steel is more abrasion resistant than aluminum. The piston of a piston extruder is typically formed from or is coated with a polymeric material that reduces abrasion between the piston and the interior of the barrel.

It is possible for a trough to be used to support the extrudate as the extrudate exits the die-land. It is also useful to draw the extrudate along the bottom of the trough by use of a conveyer belt or tape, such as a Teflon tape, to prevent the extrudate from sticking to the bottom of the trough. Other take up methods are also suitable.

Upon being extruded, the tube or other article is dried, heated to remove water and any organic components, and sintered to obtain a consolidated glass material. It is possible to perform these drying and sintering steps in a manner similar to the steps disclosed in U.S. Pat. No. 5,240,488, referenced previously. Specifically, in the process of the invention, overcladding or substrate tubes are typically dried at temperatures of about 15 to about 30° C., for a time period of about 12 to about 144 hours. Removal of water and organic components typically is performed by heating the tubes to a temperature of about 100 to about 400° C. for a time period of about 12 to about 24 hours. Finally, sintering is typically performed by heating the tubes to a temperature of about 1300 to about 1500° C. for a time period of about 5 to about 30 minutes.

For substrate tubes, a core is typically deposited by MCVD, and a core rod obtained as discussed previously. An overcladding tube is combined with the core rod and consolidated into a preform as also discussed previously. It is then possible to draw fiber from the preform in accordance with standard techniques known to those skilled in the art, reflected in DiMarcello et al., referenced previously.

The invention will be further clarified by the following example, which is intended to be exemplary.

EXAMPLE

A piston extruder was used having a 42 inch long aluminum barrel with an inner diameter of 3 inches. Attached to the barrel was a stainless steel die, the land portion of which had an outer cylinder having an inner diameter of 42 mm (defining the outer diameter of the extrudate tube), and a mandrel diameter of 32 mm (defining the inner diameter of the extrudate tube). The ratio of the cross-sectional area within the barrel to the cross-sectional area within the die-land was approximately 8. The piston was made of Acetel™, a chemically resistant thermoplastic material, to reduce abrasion of the bore of the barrel. The piston was powered by a hydraulic drive system operated by a computer controlled servo-valve, thereby allowing control of extrusion rate and back pressure in the die-land.

A silica dispersion was obtained. The silica had a nominal surface area of 50 $m^2/g$, and was present in an aqueous dispersion in an amount of about 46 wt. % based on the weight of the dispersion. The dispersion was pre-stabilized with about 0.3 wt. % tetramethyl ammonium hydroxide. The pH of the dispersion was about 11. To 10,000 g of the dispersion was added 240 g of tetramethyl ammonium hydroxide. The dispersion was then aged overnight and de-aired by evacuation with a fore pump. Then, in a static mixer, the dispersion was mixed with 115 g of methyl formate that had been chilled to 16° C., and the mixture was pumped into the barrel of an extruder through an inlet plate attached to the end of the barrel in a manner that prevented introduction of air.

The mixture was allowed to gel for an hour, at which time a viscosity of about 36,500 cps was obtained, and then the inlet plate was removed and die-land attached. The hydraulic drive was engaged, and adjusted to an extrudate velocity of about 4 m/minute. The pressure in the die was about 100 psi. The extrudate was collected in a polyvinyl chloride trough, and, to prevent sticking, a one inch strip of Teflon was placed along the bottom of the trough and used to pull the extrudate as it exited the die. When a length of about 68 to about 72 inches was extruded, the piston was halted, and the tube was separated from the die and rolled from the trough onto aluminum rollers in a drying chamber. The tubes were dried at 20° C. and 70% relative humidity for 1–2 days while being rotated at 2 revolutions per hour. The tubes were dehydroxylated (i.e., water and any organics removed), and sintered in accordance with standard methods known to those in the art, such as disclosed in U.S. Pat. No. 5,240,488, referenced previously.

Three of the sintered tubes were selected for further processing, one of which had been sintered in a fluorine-containing atmosphere to dope the tube (known in the art as down-doping). The three tubes were processed by conventional MCVD methods to deposit a germanium-doped silica core, and the tubes were then consolidated into fiber preforms (without overcladding tubes), also by conventional methods. Fiber was drawn from the tubes by conventional drawing methods, and the losses of the fibers were measured. For the preforms made from undoped substrate tubes, losses at 1310 nm were less than 0.5 dB/km, and losses at 1550 nm were less than 0.25 dB/km. For the preform made from the fluorine-doped substrate tube, the loss at 1310 nm was 0.572 dB/km, and the loss at 1550 nm was 0.287 dB/km. the preform made from the fluorine-doped substrate tube, the loss at 1310 nm was 0.572 dB/km, and the loss at 1550 nm was 0.287 dB/km.

The bodies made by the extrusion process of the invention, in the substantial absence of polymeric material in the gel, are therefore capable of being used to produce fiber exhibiting useful qualities. It is expected that even better losses will be attainable as process parameters, doping methods and levels, and refractive index profiles are modified in accordance with the properties of the extruded substrate tubes.

Other embodiments of the invention will be apparent to those skilled in the art from consideration of the specification and practice of the invention disclosed herein.

What is claimed is:

1. A process for forming an article, comprising the steps of:
   providing a silica dispersion comprising a stabilizing agent, the dispersion having a pH ranging from about 10.5 to about 13.5;
   adding a gelling agent to the silica dispersion to induce gellation; and
   extruding the resultant gel to form a body, wherein the gel comprises less than 0.5 weight percent polymeric material.

2. The process of claim 1, wherein the gel comprises less than 0.2 weight percent polymeric material, based on the weight of the dispersion.

3. The process of claim 2, wherein the gel comprises substantially no polymeric material.

4. The process of claim 1, wherein the viscosity of the gel at the initiation of extrusion is about 18,000 to about 100,000 cps.

5. The process of claim 4, wherein the viscosity is about 25,000 to about 75,000 cps.

6. The process of claim 5, wherein the viscosity is about 30,000 to about 40,000 cps.

7. The process of claim 1, wherein the silica has a surface area of about 30 to about 100 $m^2/g$.

8. The process of claim 7, wherein the silica has a surface area of about 40 to about 50 $m^2/g$.

9. The process of claim 1, wherein the stabilizing agent comprises at least one of tetramethyl ammonium hydroxide, ammonium hydroxide, and tetraethyl ammonium hydroxide.

10. The process of claim 1, wherein the stabilizing agent is present in the silica dispersion in an amount ranging from about 0.1 to about 2 wt. %, based on the weight of the dispersion.

11. The process of claim 10, wherein the stabilizing agent is present in the silica dispersion in an amount ranging from about 0.3 to about 1 wt. %, based on the weight of the dispersion.

12. The process of claim 1, wherein the gelling agent comprises at least one of methyl formate, ethyl lactate, ethyl formate, methyl acetate, and ethyl acetate.

13. The process of claim 12, wherein the gelling agent is methyl formate and is present in an amount ranging from about 0.5 to about 3 moles methyl formate per mole of stabilizing agent.

14. The process of claim 13, wherein the methyl formate is present in an amount ranging from about 1.5 to about 2.5 moles methyl formate per mole of stabilizing agent.

15. The process of claim 1, wherein the step of providing a silica dispersion comprising a stabilizing agent comprises adding the stabilizing agent to an aqueous silica dispersion comprising about 30 to about 70 wt. % silica, based on the weight of the dispersion prior to addition of the agent.

16. The process of claim 1, further comprising a step of aging the silica dispersion comprising the stabilizing agent for up to about two days prior to adding the gelling agent.

17. The process of claim 1, further comprising the step of:
adding to the silica dispersion at least one polymeric material in an amount ranging from greater than 0 to less than about 0.2 wt. %, based on the weight of the dispersion.

18. The process of claim 1, wherein the extrusion step is performed about 10 minutes to about 2 hours subsequent to adding the gelling agent.

19. The process of claim 1, wherein the extrusion step is performed such that the ratio of the cross-sectional area within a barrel of an extruder to the cross-sectional area within a die portion of the extruder is about 2 to about 10.

20. The process of claim 19, wherein the ratio is about 5 to about 8.

21. The process of claim 1, wherein an extruder used to perform the extrusion step comprises a die-land having a length:inner diameter ratio of about 1 to about 4.

22. The process of claim 1, wherein the extrusion step is performed such that the body exits a die of an extruder at a rate of about 0.25 to about 10 meters/minute.

23. The process of claim 22, wherein the rate is about 1 to about 6 meters/minute.

24. The process of claim 1, wherein an extruder used to perform the extrusion step has a die angle of about 10 to about 45 degrees.

25. The process of claim 1, wherein the extrusion step is performed such that the area reduction rate is about 2 to about 10 sec$^{-1}$.

26. The process of claim 1, wherein the article is an overcladding tube.

27. The process of claim 1, wherein the article is a substrate tube.

28. The process of claim 1, wherein the article is optical fiber, and the process further comprises the steps of forming an optical fiber preform comprising the body, and drawing optical fiber from the preform.

29. A process for forming an article, comprising the steps of:
providing a silica dispersion containing a stabilizing agent selected from tetramethyl ammonium hydroxide, ammonium hydroxide, and mixtures thereof;
adding methyl formate to the silica dispersion to induce gellation; and
extruding the resultant gel to form a body, wherein the gel comprises less than 0.5 weight percent polymeric material.

30. The process of claim 29, wherein the gel comprises less than 0.2 weight percent polymeric material, based on the weight of the dispersion.

31. The process of claim 30, wherein the gel comprises substantially no polymeric material.

32. The process of claim 29, wherein the viscosity of the gel at the initiation of extrusion is about 18,000 to about 100,000 cps.

33. The process of claim 32, wherein the viscosity is about 25,000 to about 75,000 cps.

34. The process of claim 33, wherein the viscosity is about 30,000 to about 40,000 cps.

35. The process of claim 29, wherein the stabilizing agent is present in the silica dispersion in an amount ranging from about 0.1 to about 2 wt. %, based on the weight of the dispersion.

36. The process of claim 35, wherein the stabilizing agent is present in the silica dispersion in an amount ranging from about 0.3 to about 1 wt. %, based on the weight of the dispersion.

37. The process of claim 29, wherein the methyl formate is present in an amount ranging from about 0.5 to about 3 moles methyl formate per mole of stabilizing agent.

38. The process of claim 37, wherein the methyl formate is present in an amount ranging from about 1.5 to about 2.5 moles methyl formate per mole of stabilizing agent.

39. The process of claim 29, wherein extrusion step is performed about 10 minutes to about 2 hours subsequent to adding the methyl formate.

40. The process of claim 29, wherein the extrusion step is performed such that the ratio of the cross-sectional area within a barrel of an extruder to the cross-sectional area within a die portion of the extruder is about 2 to about 10.

41. The process of claim 40, wherein the ratio is about 5 to about 8.

42. The process of claim 29, wherein an extruder used to perform the extrusion step comprises a die-land having a length:inner diameter ratio of about 1 to about 4.

43. The process of claim 29, wherein the extrusion step is performed such that the body exits a die of an extruder at a rate of about 0.25 to about 10 meters/minute.

44. The process of claim 43, wherein the rate is about 1 to about 6 meters/minute.

45. The process of claim 29, wherein an extruder used to perform the extrusion step has a die angle of about 10 to about 45 degrees.

46. The process of claim 29, wherein the extrusion step is performed such that the area reduction rate is about 2 to about 10 sec$^{-1}$.

47. The process of claim 29, wherein the article is an overcladding tube.

48. The process of claim 29, wherein the article is a substrate tube.

49. The process of claim 29, wherein the article is optical fiber, and the process further comprises the steps of forming an optical fiber preform comprising the body, and drawing optical fiber from the preform.

* * * * *